US009292048B2

(12) United States Patent
Constin

(10) Patent No.: US 9,292,048 B2
(45) Date of Patent: Mar. 22, 2016

(54) SLIDE HOUSING FOR AN ELECTRONIC COMMUNICATION DEVICE

(71) Applicant: Constin GmbH, Berlin (DE)

(72) Inventor: Hans Constin, Berlin (DE)

(73) Assignee: CONSTIN GMBH, Berlin (DE)

(*) Notice: Subject to any disclaimer, the term of this patent is extended or adjusted under 35 U.S.C. 154(b) by 0 days.

(21) Appl. No.: 14/384,332

(22) PCT Filed: Mar. 9, 2013

(86) PCT No.: PCT/DE2013/000149
§ 371 (c)(1),
(2) Date: Sep. 10, 2014

(87) PCT Pub. No.: WO2013/135231
PCT Pub. Date: Sep. 19, 2013

(65) Prior Publication Data
US 2015/0009611 A1 Jan. 8, 2015

(30) Foreign Application Priority Data

Mar. 14, 2012 (DE) .......................... 10 2012 005 521

(51) Int. Cl.
*G06F 1/16* (2006.01)
*H04M 1/02* (2006.01)
(52) U.S. Cl.
CPC ............ *G06F 1/1666* (2013.01); *G06F 1/1624* (2013.01); *G06F 1/1637* (2013.01); *G06F 1/1681* (2013.01); *H04M 1/0216* (2013.01); *H04M 1/0237* (2013.01)
(58) Field of Classification Search
CPC combination set(s) only.
See application file for complete search history.

(56) References Cited

U.S. PATENT DOCUMENTS

| 8,272,104 | B2* | 9/2012 | Chen | G06F 1/1616 16/327 |
| 8,306,585 | B2* | 11/2012 | Jang | H04M 1/0237 361/679.3 |
| 8,339,783 | B2* | 12/2012 | Wu | H04M 1/0237 361/679.01 |
| 8,559,623 | B2* | 10/2013 | Chen | H04M 1/0237 16/327 |
| 8,713,757 | B2* | 5/2014 | Chen | G06F 1/1616 16/327 |
| 8,713,758 | B2* | 5/2014 | Mitsui | G06F 1/1615 16/357 |

(Continued)

FOREIGN PATENT DOCUMENTS

DE  102011009876  8/2012

OTHER PUBLICATIONS

International Search Report issued by the European Patent Office in International Application PCT/DE2013/000149 on Jul. 25, 2013.

*Primary Examiner* — Lisa Lea Edmonds
(74) *Attorney, Agent, or Firm* — Henry M. Feiereisen LLC

(57) ABSTRACT

An electronic communication device having a touch-sensitive display panel in a display module and a keypad in a keypad module is disclosed. The two modules are connected to one another and can be moved relative to one another into an open position and a closed position. The touch-sensitive display panel is on the outside of the display module in the closed position. Guide members on both sides of the keypad of the keypad module can operatively interact with guide members associated with the display module. The keypad module has a rotatable traction member that can operatively interact with a fixed traction member of the display module. The display module is mounted on the keypad module so as to be able to slide or move. In fully slid-out position, the display module can be rotated or tilted or folded against the keypad module in a manner similar to a laptop PC.

9 Claims, 9 Drawing Sheets

(56) References Cited

U.S. PATENT DOCUMENTS

| | | | | |
|---|---|---|---|---|
| 8,718,725 B2* | 5/2014 | Kemppinen | ........ | H04M 1/0237 379/428.01 |
| 8,982,548 B2* | 3/2015 | Totsuka | ................ | G06F 1/1616 361/679.01 |
| 9,173,319 B2* | 10/2015 | Ahn | ......................... | H05K 7/16 |
| 2006/0109250 A1 | 5/2006 | Prichard et al. | | |
| 2008/0081505 A1 | 4/2008 | Ou et al. | | |
| 2012/0026654 A1* | 2/2012 | Ou | ........................ | G06F 1/1624 361/679.01 |
| 2012/0077555 A1* | 3/2012 | Jung | ..................... | G06F 1/1616 455/575.4 |
| 2013/0010431 A1* | 1/2013 | Ogatsu | ................ | H04M 1/0237 361/727 |
| 2013/0040701 A1 | 2/2013 | Constin | | |
| 2013/0128465 A1* | 5/2013 | Oh | ........................ | G06F 1/1624 361/726 |

* cited by examiner

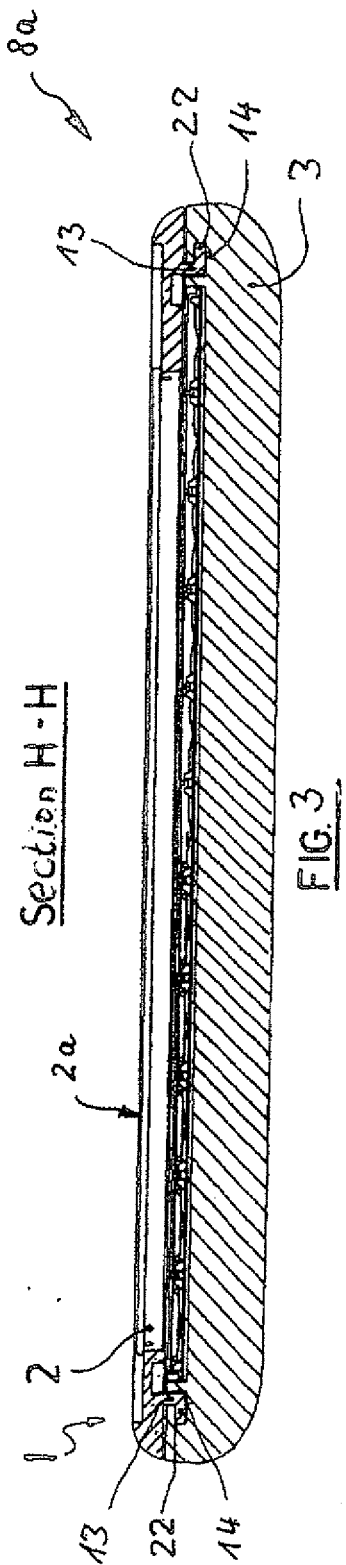
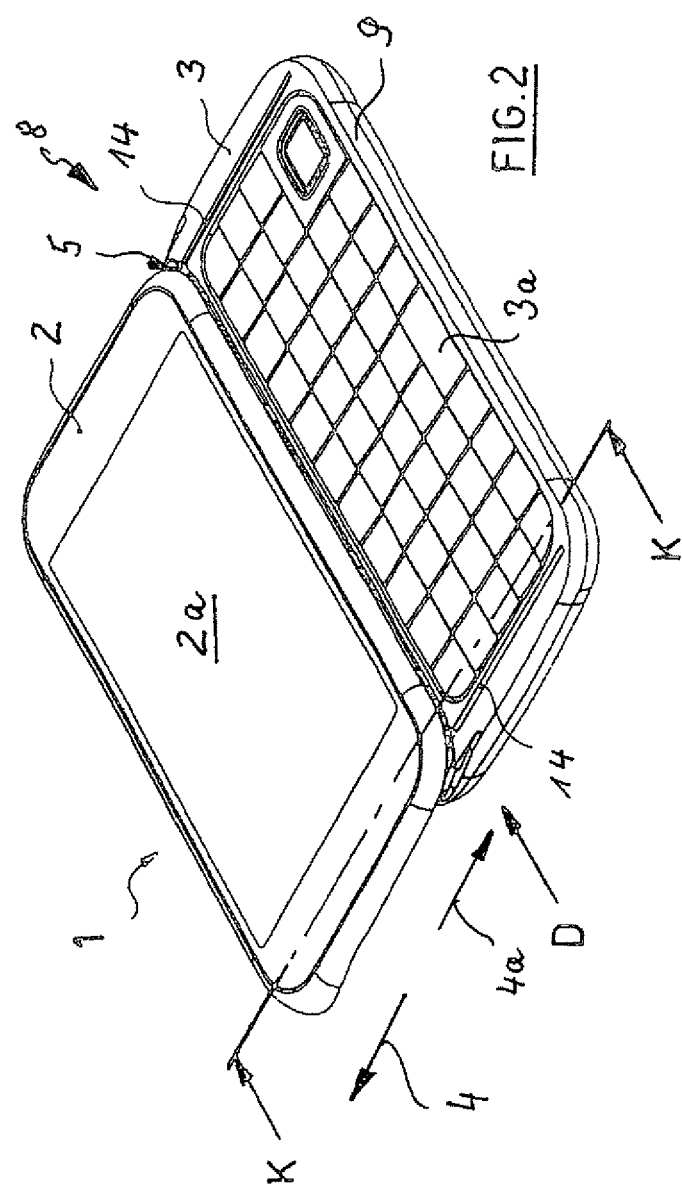

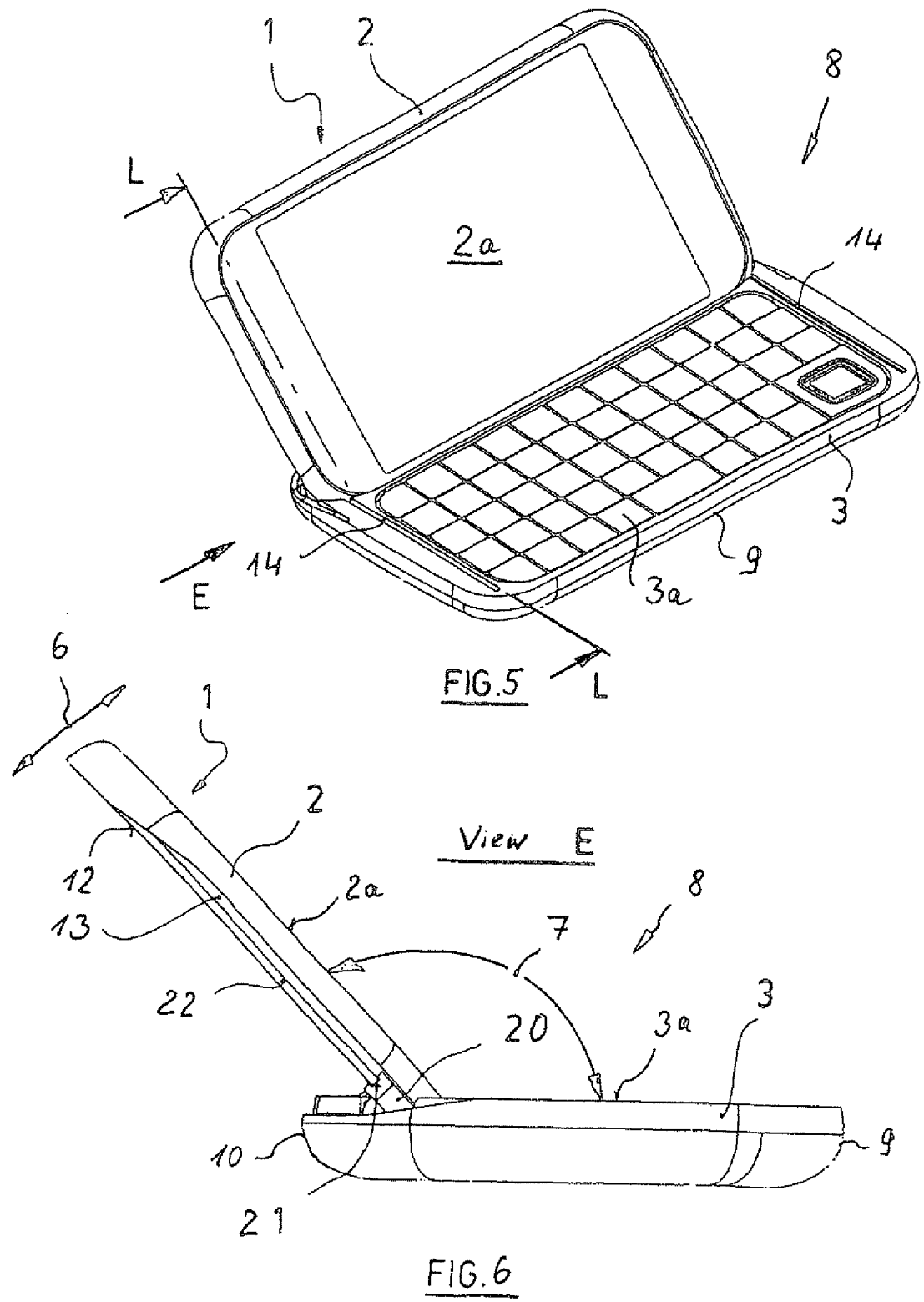

SLIDE HOUSING FOR AN ELECTRONIC COMMUNICATION DEVICE

CROSS-REFERENCES TO RELATED APPLICATIONS

This application is the U.S. National Stage of International Application No. PCT/DE201300149, filed Mar. 9, 2013, which designated the United States and has been published as International Publication No. WO 2013/135231 and which claims the priority of German Patent Application, Serial No. 10 2012 005 521.8, filed Mar. 14, 2012, pursuant to 35 U.S.C. 119(a)-(d).

BACKGROUND OF THE INVENTION

The invention relates to an electronic communication device having a display module with a touch-sensitive display panel, and a keypad module with a keypad, which are connected with each other and movable in relation to one another into an open position or a closed position, with the touch-sensitive display panel being associated to the display module on the outside in the closed position.

DE 10 2011 009 876 discloses an electronic communication device which by opening and subsequent swiveling of the display module becomes a minicomputer in which the display module stands at a slant to the keypad module in its final position. This requires a dual lever mechanism which is relatively sensitive in operation and is not stable when the two modules are skewed. Moreover, the area of the keypad is limited in terms of depth. Also, a certain clearance between the display module and the keypad module is needed, so that the space usable for the electronics is reduced.

SUMMARY OF THE INVENTION

Object of the present invention is to provide an electronic communication device in which the display module can be reliably shifted and tilted up relative to the keypad module.

This object is achieved by an electronic communication device having a display module with touch-sensitive display panel and a keypad module with a keypad, which are connected to one another and are moveable relative to one another into an open position and a closed position, with the touch-sensitive display panel being arranged on the outside of the display module in the closed position, wherein guide members are provided on both sides of the keypad of the keypad module which can be brought into interaction with guide members associated to the display module, and rotatable traction members associated to the keypad module can be brought into interaction with fixed traction members associated to the display module.

In an advantageous embodiment of the invention, the traction members associated to the keypad module on both sides, or form-fitting elements, are connected to one another via a rigid connection member for synchronous rotation.

In a further advantageous embodiment of the invention, the guide members associated to the display module are liberated from the guide members of the keypad module and come into connection with guide-piece grooves in guide pieces. The guide pieces are arranged on both ends of the rigid connection member. The rigid connection member, i.e., a shaft, also serves as the axis of rotation about which the guide pieces can be swiveled for raising the display module about a predefined angle. For this purpose, limit means are associated to the guide pieces to position the guide-piece grooves in alignment with the guide members of the keypad module each time the display module is transferred.

The trailing edge of the keypad module is hereby provided with a longitudinal recess in which the leading edge of the display module can be engaged. As a result, the display module can be brought into a slanted open position, without its leading edge extending beyond the keypad module in an undesired manner.

In a further advantageous embodiment of the invention, an axially slideable contact block and an axially fixed tilt block are arranged on the rigid connection member. Contact springs are provided in the contact block for making an electronic connection between the modules. Means are provided for that purpose by which the contact springs, for example spring pins, can move in and out, via an inclined plane for example.

The rigid connection member, for example a shaft, has a helical groove in which an engagement member, associated to the contact block, is guided. The contact block is axially moved by the helical groove, when the shaft is rotated. As a result of this axial displacement, the contact springs are moved into and out of the contact block. The contact springs, when moved out, establish an electronic connection between the modules and the electronics, which is broken again when the contact springs retract.

BRIEF DESCRIPTION OF THE DRAWING

Further advantageous embodiments of the invention are the subject matter of the sub-claims. The invention is illustrated by way of example in the appended drawings and will be described in greater detail below; it is shown in:

FIG. 2 the isometric illustration of an electronic communication device according to FIG. 1 in open position, with display module being pushed out in guide grooves and with keypad module being exposed;

FIG. 3 an electronic communication device taken along the section line H-H in FIG. 1;

FIG. 5 the isometric diagram of an electronic communication device according to FIG. 1, with the display module tilted into slanted position and the display panel turned toward the keypad module;

FIG. 6 the side view of an electronic communication device according to view E in FIG. 5; with the display module being tilted into the slanted position in accordance with the invention;

DETAILED DESCRIPTION OF PREFERRED EMBODIMENTS

Figure 1:
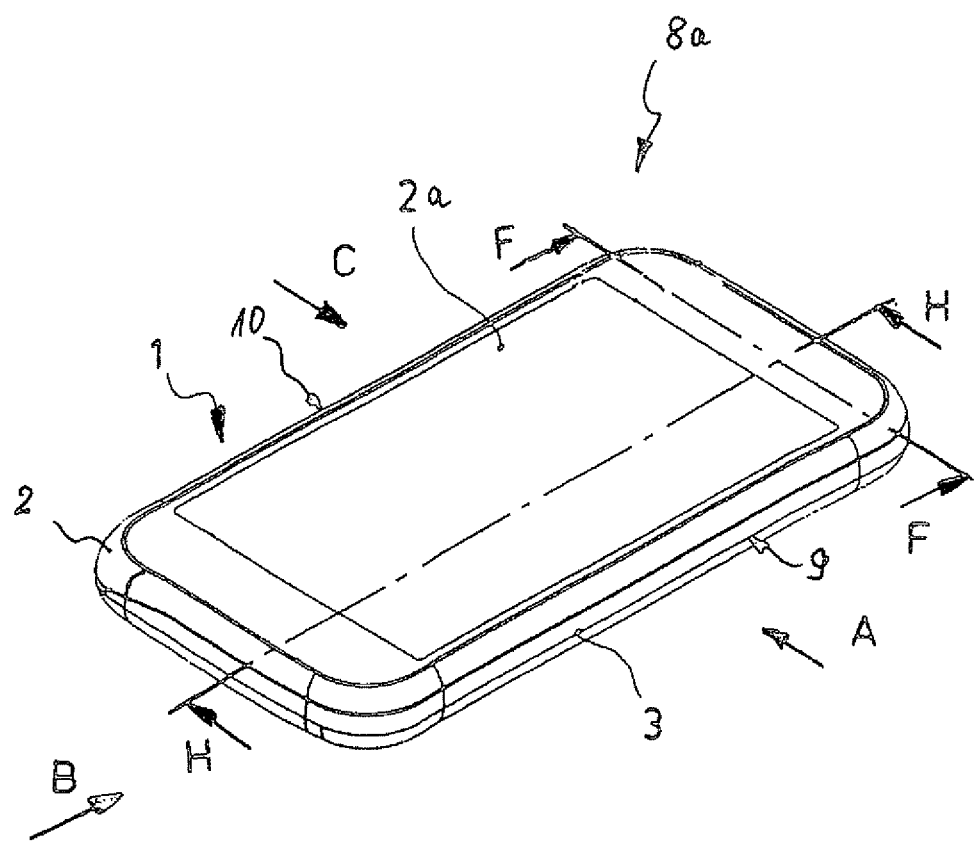
FIG. 1 the isometric illustration of an electronic communication device in accordance with the invention in closed position.

The closed electronic communication device 1 shown in FIG. 1, for example a smartphone, a laptop, a notebook or a mobile telephone, comprises a display module 2, and an input or keypad module 3, which are moveably connected to each other. The display module 2, for example a monitor, has a touch-sensitive display panel 2a, a so-called touchscreen for example.

The display module 2 and the keypad module 3 can be slid in relation to one another, as shown in FIG. 2. For example, by sliding in slide direction 4, a keypad 3a covered by the display module 2 can be used. The input or keypad module 3 can also have a touch-sensitive operating surface. The display module 2 can be pushed into an open position 8 relative to the leading side 9 of the keypad 3a using guide members 14.

As FIG. 3 shows a closed position 8a taken along the section line H-H shown in FIG. 1, the guide members are formed here as guide grooves 14 extending in the keypad module 3 on both sides of the keypad 3a. The guide grooves 14 interact with correspondingly configured guide members on the backside 12 of the display module 2, here for example guide rails 13. In this exemplified embodiment, the guide grooves 14 are configured as L-shaped and are provided with angles 22 extending out from them. The also L-shaped guide rails 13 are guided in these angles 22.

Figure 4:
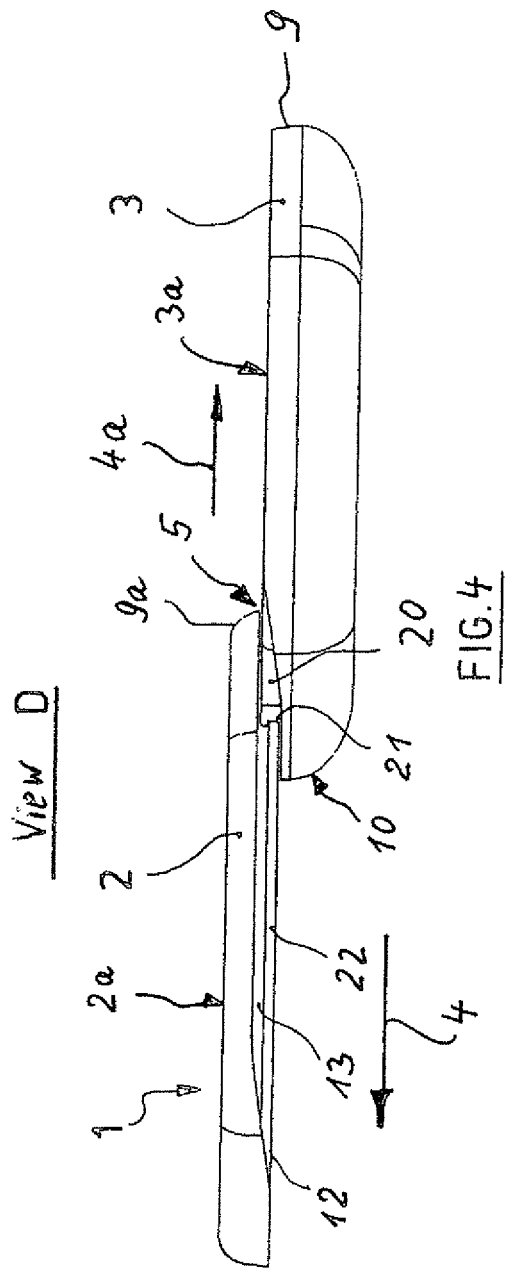
FIG. 4 the side view of an electronic communication device according to view D in FIG. 2, with the display module being pushed into guide grooves and guide rails.

Upon reaching the end sliding position 5, as is shown in FIG. 4, the leading edge 9a of the display module 2 covers the trailing edge 10 of the keypad module 3. In this position, the guide rails 13 on the backside 12 of the display module 2 are liberated from the guide grooves 14 of the keypad module 3 and moved into the guide-piece grooves 21 of guide pieces 20. The guide pieces 20 having guide-piece grooves 21 are arranged on both sides of the keypad 3a in the keypad module 3. They are brought into correspondence with the angles 22 of the guide rails 13, when the display module 2 slides open. In another embodiment, not shown, the guide grooves 14 can be used without angles.

After moving the guide rails 13 of the display module 2 into the guide-piece grooves 21 of the guide pieces 20, the display module 2 can be elevated in the tilt direction, as illustrated in FIGS. 5 and 6. In this end sliding position 5, the display module 2 can be tilted up about a tilt angle 7 of about 130-140° relative to the keypad module 3 to an open position 8. The display panel 2a, positioned on the outside when the electronic communication device 1 is closed, is now turned toward the keypad 3a of the keypad module 3. The display panel 2a of the display module 2 now serves as monitor for the now exposed keypad 3a of the keypad module 3. Should the keypad 3a of the keypad module 3 not be needed, the display module 2 can be tilted back and pushed back into the closed position 8a over the keypad module 3 in slide direction 4a.

Figure 7:
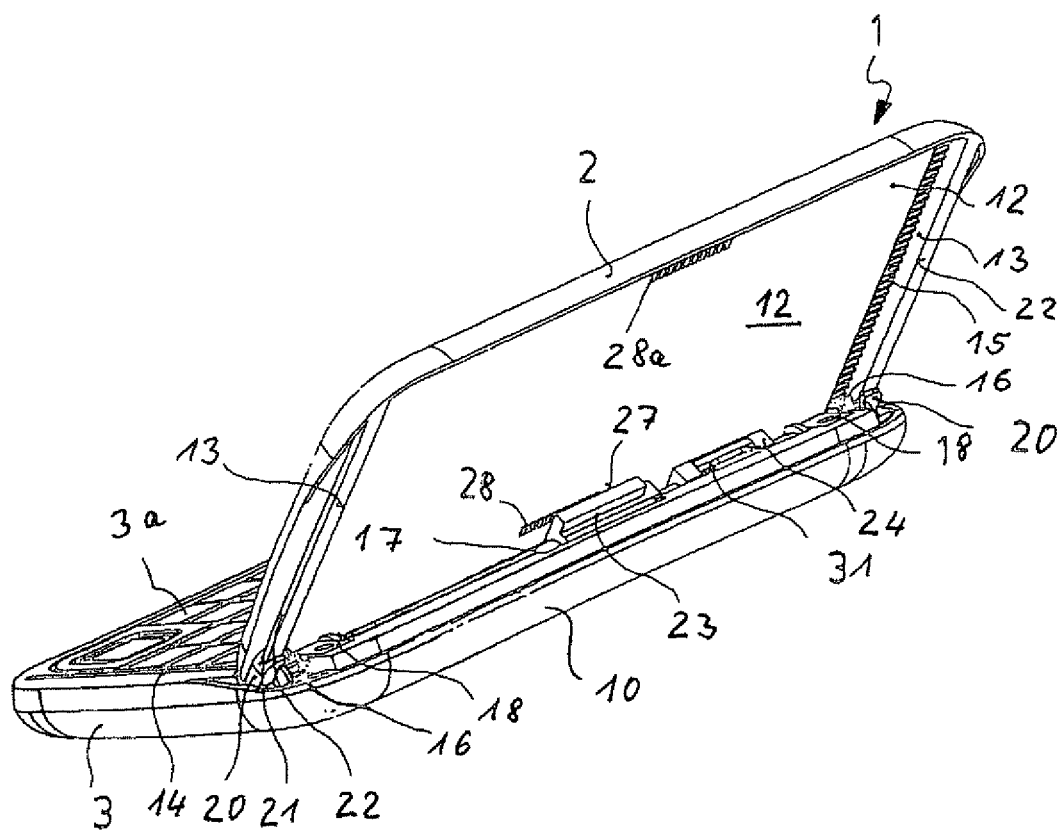
FIG. 7 the isometric diagram of the rear view of an electronic communication device according to FIG. 5, with the display module tilted into the slanted position, fixed traction members according to the invention in the form of tooth profiles for interaction with a recess longitudinally extending in the area of trailing edge of the keypad module, with traction members associated on both ends in form of gears.

As shown in FIG. 7, the backside 12 of the display module 2 has fixed traction members on both sides, shown here as tooth profiles for example. The fixed traction members interact by form fit with rotatable traction members associated to the keypad module 3. In this exemplary embodiment, the rotatable traction members are configured as gears 16 which mesh with the tooth profiles 15. The gears are arranged axially outside on a shaft 17 and secured against rotation. The ends of the shaft 17 are rotatably mounted in shaft bearings 18 and ensure in accordance with the invention as rigid connection member a run of the terminal gears 16 in synchrony with each other. According to the invention, the shaft 17 serves simultaneously as rotation axis and pivot axis for the display module 2, when the latter is lifted upwards to its open position.

A contact block 21 and a tilt block 24 are further arranged on the shaft 17. The contact block 21 is axially slideable and provided with contact springs 27 that can move in and out and interact with upper contact surfaces 28a and lower contact surfaces 28 on the backside 12 of the display module 2. The upper contact surfaces 28a provide an electronic connection between the display module 2 and the keypad module 3 in the closed position 8a, while the lower contact surfaces 28 provide an electronic connection in the open position 8 shown here. To minimize wear, the contact springs 27 can be moved in and out of the contact block 24, when the display module 2 is moved open and closed in relation to the keypad module 3. This ensures the presence of an electronic connection to electronics, regardless whether the communication device 1 is open or closed. The tilt block is restrained against axial movement and rotatable about on the shaft 17 by the respectively predefined tilt angle 7.

Figure 8:
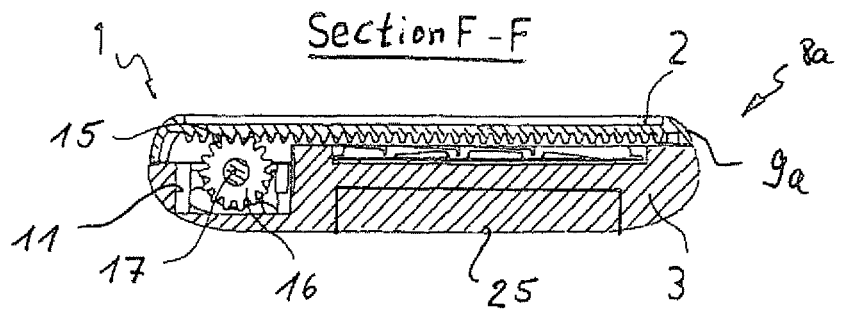
FIG. 8 the side view of a closed electronic communication device, taken along the section line F-F in FIG. 1, with a tooth profile and a gear thereon and guided on a shaft in meshing engagement therewith.

FIG. 8 shows the side view of an electronic communication device 1, taken along the section line F-F shown in FIG. 1, in the closed position 8a. The rod-shaped tooth profile 15 on the backside 12 of the display module 2 can be seen and guides a gear 16 affixed to the shaft 17. Gears 16 affixed on both ends of the shaft 17 are provided as means for transferring the sliding motion. The gears 16 are provided with an involute gear profile, for example, which meshes with the tooth profiles 15. This ensures that the gears 16 associated on both ends run in synchronism in accordance with the invention. This prevents the display module 2 from being skewed relative to the keypad module 3.

In place of gears and tooth profiles interacting therewith, friction rollers can be used as transmitting members and are ensured to run in synchronism by respectively equipped traction strips.

The keypad module 3 serves not only to receive the keypad 3a but also to receive the electronics 25 which is schematically shown here beneath the keypad 3a. A longitudinal recess 11 is provided in the area of the trailing edge 10 of the keypad module 3. The recess 11 is provided to receive the shaft 17, shown here in cross section, as well as the gears 16, rotationally affixed to the shaft 17, and the guide pieces 20.

Figure 9:
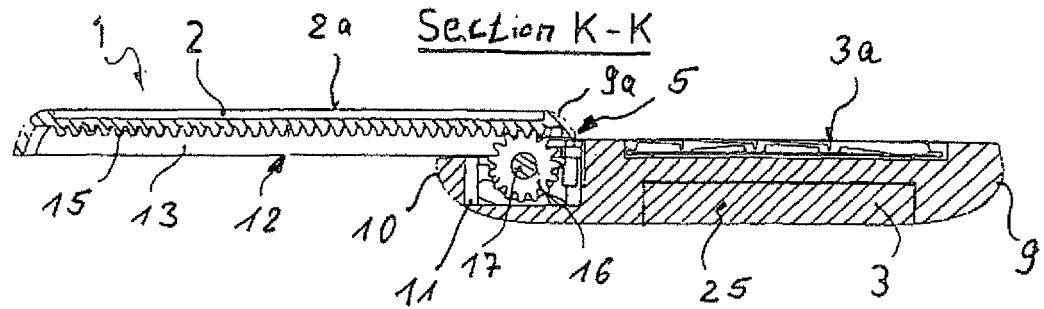
FIG. 9 the side view of an electronic communication device, taken along the section line K-K in FIG. 2, with display module being pushed out relative to the keypad module, with a tooth profile and a gear thereon and guided on a shaft in meshing engagement therewith.

FIG. 9 shows the side view of an electronic communication device 1 taken along the section line K-K in FIG. 2. The display module 2 is pushed out in relation to the keypad module 3. A tooth profile 15 can be seen on the backside of the display module 2 and interacts with rotatable traction members, namely gears 16, that are associated to the keypad module 3. The gears 16 are secured against rotation and guided on the shaft 17.

Figure 10:
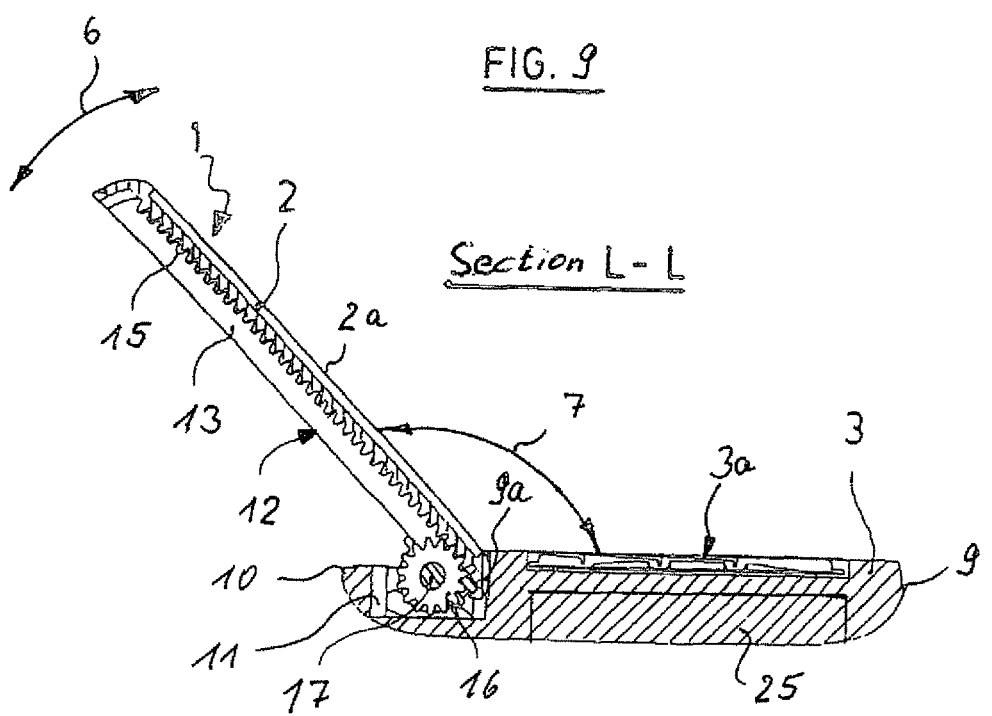
FIG. 10 the side view of an electronic communication device, taken along the section line L-L in FIG. 5, with display module being tilted up into the slanted position about the shaft as rotation axis and turned toward the keypad module.

FIG. 10 shows the side view of the electronic communication device 1, taken along the section line L-L in FIG. 5. The display module 2 is hereby tilted up to its slanted open position 8 in tilt direction 6 about a predefined tilt angle 7, for example of about 130-140°, in relation to the keypad module 3. In this open position 8, the touch-sensitive display panel 2a of the display module 2 is now turned toward the keypad 3a and serves as monitor for the use of the electronic communication device 1, for example as computer, laptop, notebook and the like, with the telephone function of the smartphone remaining as before. The leading edge 9a of the display module 2 is lowered into the longitudinal recess 11 in the area of trailing edge 10 of the keypad module 3 in accordance with the invention.

Figure 11:
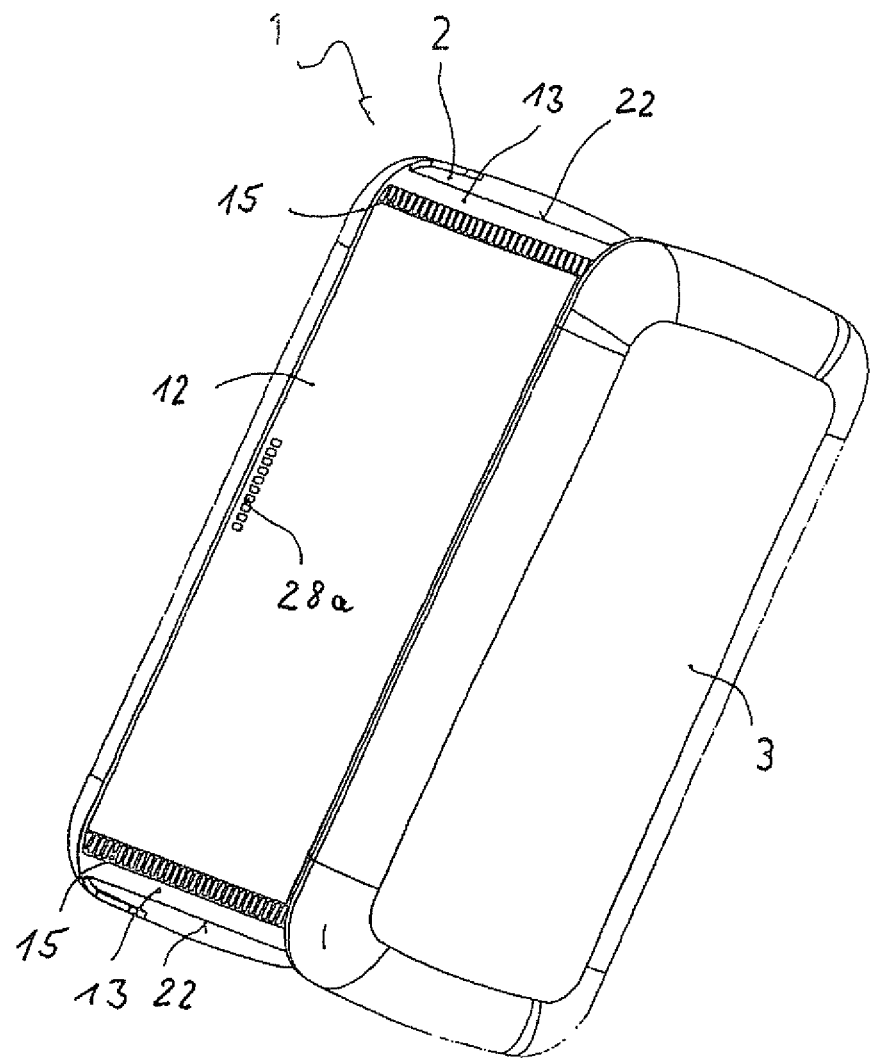
FIG. 11 the backside of an electronic communication device with display module being pushed out according to FIG. 2, with traction members in the form of tooth profiles being arranged on both sides.

FIG. 11 shows the backside 12 of an electronic communication device 1 with the display module 2 being pushed out along the guide grooves 14 but not yet tilted up into the slanted position. The tooth profiles 15 provided on both sides and the L-shaped guide rails 13 provided with angles 22 can be seen. Also illustrated is the upper contact surface 28a which does not provide here a connection function between the display module 2 and the keypad module 3. In another embodiment, not shown here, a continuous contact surface may also be provided that remains in continuous electronic contact with the contact springs 27 of the contact block 23 during sliding of the display module 2 relative to the keypad module 3.

Figure 12:
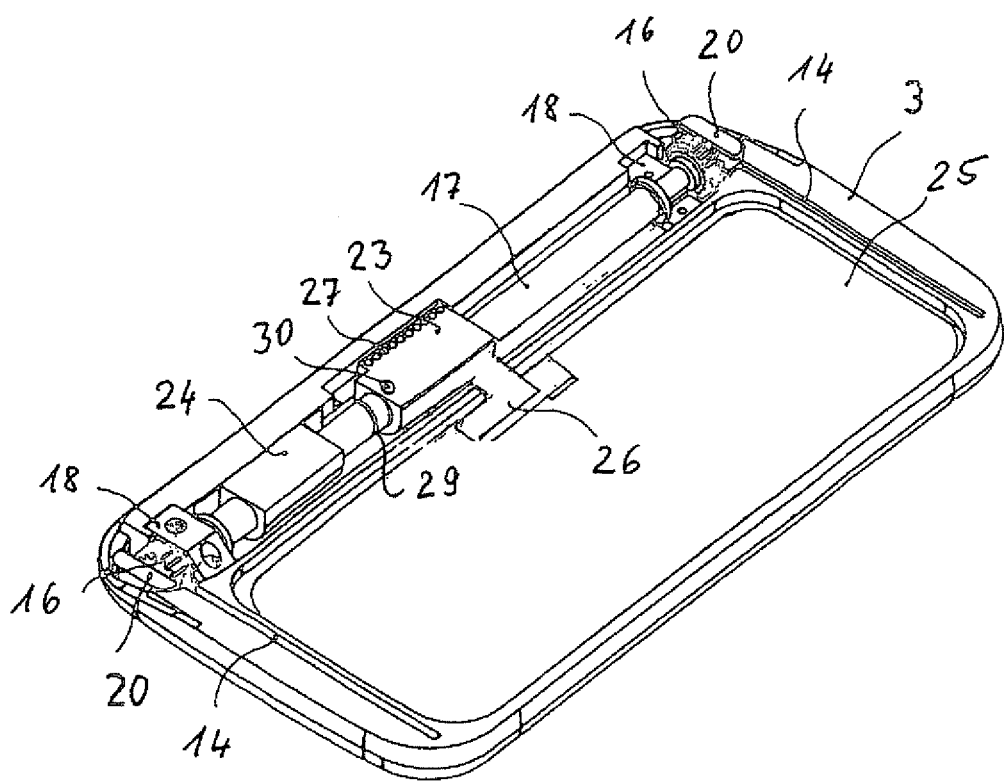
FIG. 12 the isometric illustration of an electronic communication device of FIG. 1, with electronics being associated with the keypad module and electronic connection to a contact block.

FIG. 12 shows the plan view onto the keypad module 3 of an electronic communication device 1 without keypad and display module. The shaft 17 can be seen here to which the guide pieces 20 are secured on both ends and restrained against rotation. The shaft 17 is rotatably mounted in shaft bearings 18.

To secure the electronic connection between the display module 2 and the keypad module 3, the contact block 23 is provided with an engagement member 30 that is guided in a helical groove 29. The contact block 23 is axially slideable along the shaft 17 by the helical groove 29 and the engagement member 30. As a result of this axial displacement, the contact springs 27 can be moved into and out of the contact block 23, for example via an oblique plane. The electronics 25 remain in electronic contact with the contact block 23 through a flexible cable 26 or spring contacts. The electronic connection can also be realized via optical signals or fiber optics.

Figure 13:
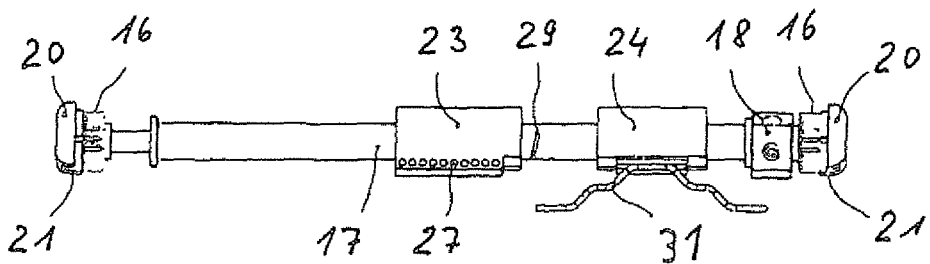
FIG. 13 the detailed illustration of a shaft with display module being pushed out, with a contact block having contact springs and with a helical groove for axial displacement of the contact block, and with a tilt block in operative interaction with a striker spring.
Figure 14:
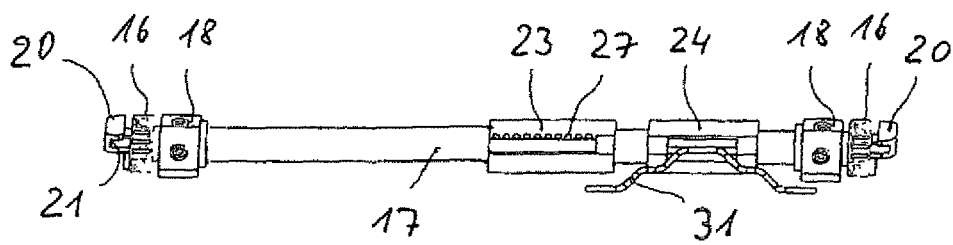
FIG. 14 the detailed illustration of a shaft with display module being tilted upwards, with a contact block having contact springs, with a tilt block having a striker spring.

As FIGS. 13 and 14 show in detail, the contact block 23 and tilt block 24 are associated to the shaft 17. The tilt block 24 is secured against axial displacement by a striker spring 31 which supports the slanted position, when display module 2 is pushed open and tilted up in its open position 8. The striker spring 31 supports itself on the keypad module 3, on one hand, and in the tilt block 24, on the other hand.

The striker spring 31 is dimensioned such that the tilt block 24 does not exert any direct pressure on the keypad module 3 during parallel displacement of the display module 2. Thus, only a very slight moment is applied to the shaft 17 and the sliding movement between the two modules 2 and 3 is not interfered with.

Figure 15:
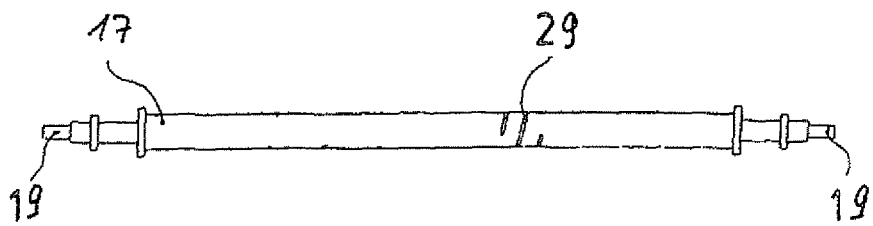
FIG. 15 the detailed illustration of a shaft having a helical groove according to FIGS. 13 and 14 and shaft ends on both sides for connection with guide pieces.

As FIG. 15 shows in detail, the shaft 17 is provided with a helical groove 29 in which the engagement member 30 of the contact block 23 is guided. The shaft 17 is provided with shaft ends 19 on which the afore-described guide pieces 20 are rotatably arranged.

The invention claimed is:

1. An electronic communication device, comprising:
    a display module having a touch-sensitive display panel and guide members;
    a keypad module having a keypad, said display module and said keypad module being connected to one another and moveable relative to one another into an open position and a closed position, with the touch-sensitive display panel being arranged on an outside of the display module in the closed position;
    traction members arranged on both sides of the keypad module;
    a rigid connection member connecting the traction members to one another so as to rotate in synchronism,
    wherein the display module is tiltable in relation to the keypad module in the open position about a predefined tilt angle,
    wherein the guide members of the display module are configured to become liberated from guide members of the keypad module and to move into guide-piece grooves of guide pieces associated to the rigid connection member.

2. The Electronic communication device of claim 1, wherein the guide members of the display module are configured to move into the guide pieces provided on both ends of the rigid connection member.

3. The Electronic communication device of claim 1, wherein the display module is tiltable with its leading edge in a longitudinal recess in an area of a trailing edge of the keypad module.

4. The Electronic communication device of claim 3, wherein the display module is tiltable with its leading edge in the longitudinal recess about the rigid connection member as rotation axis.

5. The Electronic communication device of claim 4, wherein the rigid connection member defines the rotation axis for raising the display module about a predefined angle.

6. The Electronic communication device of claim 1, further comprising a contact block and a tilt block which are axially displaceable on the rigid connection member.

7. The Electronic communication device of claim 6, wherein the rigid connection member has a helical groove in which an engagement member associated with the slidable contact block is guided so as to axially move the contact block.

8. The Electronic communication device of claim 6, wherein the contact block has contact springs which move in and out in response to an axial displacement of the contact block.

9. The Electronic communication device of claim 8, wherein the contact springs of the contact block provide an electronic connection of the keypad module and the display module to an electronics via contact surfaces on a backside of the display module.

\* \* \* \* \*